(12) United States Patent
Suzuki

(10) Patent No.: US 7,219,551 B2
(45) Date of Patent: May 22, 2007

(54) DIFFERENTIAL PRESSURE SENSOR

(75) Inventor: Isao Suzuki, Tokyo (JP)

(73) Assignee: MKS Japan, Inc., Tokyo (JP)

( * ) Notice: Subject to any disclaimer, the term of this patent is extended or adjusted under 35 U.S.C. 154(b) by 0 days.

(21) Appl. No.: 11/296,330

(22) Filed: Dec. 8, 2005

(65) Prior Publication Data
US 2006/0169048 A1   Aug. 3, 2006

(30) Foreign Application Priority Data
Jan. 28, 2005   (JP) .............................. 2005/21362

(51) Int. Cl.
*G01L 5/00*   (2006.01)
(52) U.S. Cl. ..................... 73/718; 73/716; 73/724; 73/736
(58) Field of Classification Search .............. 73/700, 73/716, 718, 724, 736
See application file for complete search history.

(56) References Cited
U.S. PATENT DOCUMENTS

| | | | | |
|---|---|---|---|---|
| 4,366,716 | A | * | 1/1983 | Yoshida ........................ 73/718 |
| 4,388,833 | A | * | 6/1983 | Kuwayama ................... 73/718 |
| 4,785,669 | A | | 11/1988 | Benson et al. |
| 5,551,299 | A | * | 9/1996 | Tamai et al. .................. 73/706 |
| 5,796,007 | A | * | 8/1998 | Panagotopulos et al. ...... 73/716 |
| 5,992,240 | A | | 11/1999 | Tsuruoka et al. |
| 6,431,003 | B1 | | 8/2002 | Stark et al. |
| 6,581,496 | B2 | | 6/2003 | Zinsser-Krys et al. |
| 6,640,640 | B2 | | 11/2003 | Scholz et al. |

* cited by examiner

Primary Examiner—Andre Allen
(74) Attorney, Agent, or Firm—Wenderoth, Lind & Ponack, L.L.P.

(57) ABSTRACT

According to the present invention, there is provided a high-precision differential pressure sensor which is not affected by a considerable change in baseline pressure. A differential pressure sensor of the present invention includes: a pair of diaphragms, each including a diaphragm portion capable of being deformed due to application of a pressure and a support portion for holding an outer peripheral edge of the diaphragm portion; a pair of fixed electrodes in disk-like form fixed to the support portions of the diaphragms; and a movable electrode including a disk-like electrode portion and shaft-like projections extending in opposite directions from a central portion of the electrode portion. The shaft-like projections extend at a right angle relative to the electrode portion, and the movable electrode is secured to central portions of the diaphragms through the shaft-like projections so that the electrode portion faces each of the fixed electrodes in a predetermined spaced relationship. The movable electrode is capable of moving so as to allow a distance between the electrode portion and each of the fixed electrodes to vary according to a difference between fluid pressures acting on the respective diaphragm portions of the diaphragms. A capacitance generated between the electrode portion and each of the fixed electrode changes due to a variance in the distance between the electrode portion and each of the fixed electrode, and a differential pressure is detected, based on this change in capacitance.

14 Claims, 8 Drawing Sheets

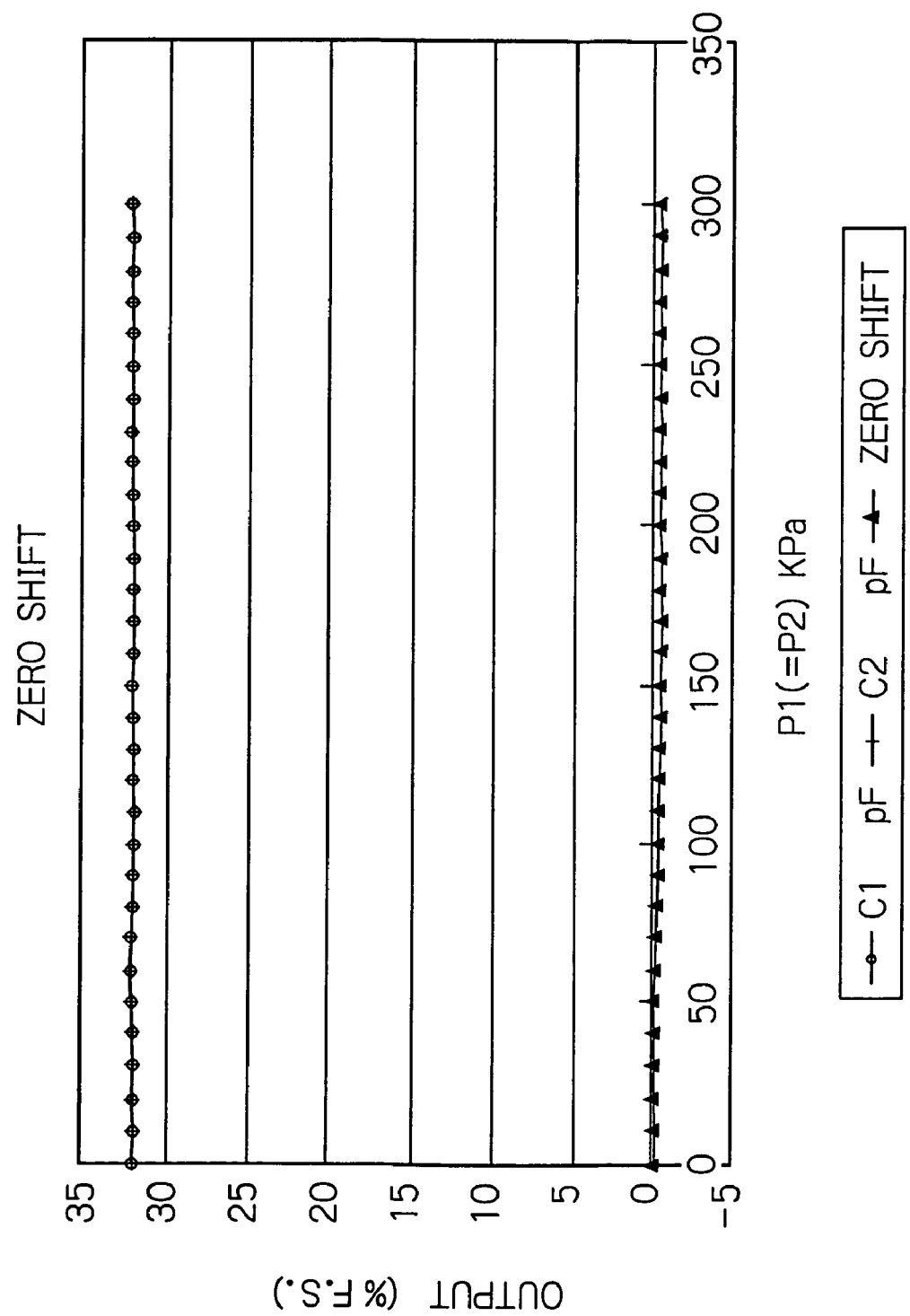

DIFFERENTIAL PRESSURE SENSOR

BACKGROUND OF THE INVENTION

The present invention relates to a sensor for measuring a differential pressure of liquids and the like.

As a sensor for measuring a pressure of a liquid, use is made of a diaphragm-type pressure sensor so as to avoid a sensor portion being adversely affected by a liquid to be measured. As a method for measuring a differential pressure of two liquids, there is a method of using two diaphragm-type pressure sensors, in which a differential pressure is determined from a difference between outputs of the two sensors. In this method, however, a measurement error is likely to occur when the characteristics of the two sensors are not truly identical.

U.S. Pat. No. 6,640,640B2 and U.S. Pat. No. 6,431,003B1 disclose a sensor comprising two diaphragms disposed so as to face each other and which are connected to each other by means of a rod. In this sensor, a pressure applied to one diaphragm is transmitted to the other diaphragm. Therefore, only a difference between the pressures applied to the two diaphragms can be detected. In U.S. Pat. No. 6,640,640B2 and U.S. Pat. No. 6,431,003B1, piezo resistance elements are respectively provided in the two diaphragms and a difference in resistance value between the two piezo resistance elements is provided as an output of the sensor, or an electrode is provided so as to face the two diaphragms to thereby form a capacitor between the electrode and each of the two diaphragms, and a change in capacitance of the capacitor is detected to provide an output of the sensor. In these techniques, when the pressures acting on the diaphragms increase to a great extent, the diaphragms are subject to intricate deformation, as shown in FIG. 1. In such a case, an amount of deformation of each of the diaphragms exceeds a level corresponding to a differential pressure to be detected. For example, in a case that a 50 kPa full-scale differential pressure sensor is used with a baseline pressure of 300 kPa, deformation such as that shown in FIG. 1 significantly influences a resistance value of the piezo element provided in the diaphragm or a capacitance value of the capacitor between the diaphragm and the corresponding surface of the electrode. Although both of the diaphragms are subject to intricate deformation, it is extremely difficult to achieve the completely equal levels of influence of intricate deformation of each of the two diaphragms. Consequently, a zero output of the sensor shifts easily. Further, highly accurate and sensitive detection of a differential pressure is difficult in a method using a piezo resistance element directly attached to the deforming diaphragm or a method of conducting direct, electrical conversion of a change in capacitance of a capacitor formed by the deforming diaphragm.

Generally, as a method for detecting an amount of deformation of the diaphragm, there is a method of detecting a change in resistance value of a piezo element provided in part of the diaphragm. There is also a capacitor-type method using a diaphragm made of a metal, in which an electrode is provided so as to face the diaphragm, and in which a change in capacitance of a capacitor formed between the diaphragm and the electrode is detected. Although the capacitor-type method requires a relatively complex electrical system, the capacitor-type method is free from problems such as thermal noise, and is stable in terms of a temperature, due to the principles of operation. Therefore, the capacitor-type method is suitably applied to a high-precision diaphragm-type pressure sensor.

FIG. 2 is a diagram for explaining an operation of a conventional capacitor-type differential pressure sensor. Disk-like electrodes E1 and E2 are disposed so as to face metal diaphragms D1 and D2, respectively, to thereby form capacitors C1 and C2. This sensor is adapted to detect a difference between pressures P1 and P2 as a difference between capacitances of the capacitors C1 and C2.

The present inventor has made intensive studies with respect to a change in capacitance of the capacitors C1 and C2 due to a pressure applied to the diaphragms D1 and D2. As a result, it has been found that a variance in output of the capacitors and a shift of a zero point as shown in FIG. 3 are obtained. From this result, it has been found that due to a rise in pressure applied to the opposing surfaces of the diaphragms, capacitances of the capacitors C1 and C2 change, and there is a slight difference between an amount of change in capacitance of the capacitor C1 and an amount of change in capacitance of the capacitor C2. That is, even when the same pressure is applied to the two diaphragms, there is a slight difference in deformation between the two diaphragms, and the capacitances of the capacitors C1 and C2 become different from each other, thus changing an output of the sensor.

SUMMARY OF THE INVENTION

It is therefore an object of the present invention to solve the above-described problem of the conventional differential pressure sensor, and to provide a diaphragm-type differential pressure sensor capable of achieving highly accurate and sensitive detection of a differential pressure, without being affected by a considerable change in baseline pressure.

In order to achieve the above-described object, the present invention provides a differential pressure sensor comprising a pair of diaphragms each capable of being deformed according to a pressure applied, each being at least partially made of a metal and the pair having a common center axis, and a disk-like movable electrode provided between the pair of diaphragms and located on the common center axis, the movable electrode being at least partially made of a metal.

Each of the opposing surfaces of the movable electrode includes a shaft-like projection formed at a central portion thereof, the shaft-like projection being secured to a central portion of an associated one of the diaphragms.

Fixed electrodes are held by outer peripheral portions of the pair of diaphragms, so as to face the opposing surfaces of the movable electrode. A change in capacitance between the movable electrode and each of the fixed electrodes is detected to determine a differential pressure.

In the differential pressure sensor of the present invention, it is preferred that the fixed electrodes be formed by a pair of fixed electrodes respectively provided on surfaces of electrically insulated disk-like members, the electrically insulated disk-like members being secured to the outer peripheral portions of the pair of diaphragms.

Another fixed electrode may be provided on a surface of each of the electrically insulated disk-like members, which surface is in opposing relation to the surface on which one of the pair of fixed electrodes is provided.

It is preferred that a hole be formed at a central portion of each of the pair of fixed electrodes so as to allow the shaft-like projection of the movable electrode to extend therethrough, and that a hole be also formed at a central portion of each of the electrically insulated disk-like members so as to allow the shaft-like projection of the movable electrode to extend therethrough.

Said another fixed electrode can be used to correct an output value of the differential pressure, based on a change in capacitance between said another fixed electrode and the diaphragm facing said another fixed electrode.

A surface of each of the pair of diaphragms that makes contact with an object to be detected may be at least partially covered by a fluorine type polymer resin.

In the present invention, differing from a conventional technique, a capacitor electrode is not formed by the diaphragm itself, but is formed by the movable electrode disposed between the two diaphragms. Since opposite sides of the movable electrode are pressed under equal forces through the diaphragms, a position of the movable electrode does not change even when the diaphragms deform, and therefore no change occurs with respect to the capacitances of the capacitors C1 and C2 formed between the movable electrode and the fixed electrodes. Therefore, if the baseline pressure changes considerably, a zero output is stable, and accurate measurement can be conducted.

BRIEF DESCRIPTION OF THE DRAWINGS

FIG. 6a is a graph indicating results of measurements of outputs of capacitors C1 and C2 and a shift of a zero point in the differential pressure sensor of the present invention.

DETAILED DESCRIPTION OF THE INVENTION

Figure 4:
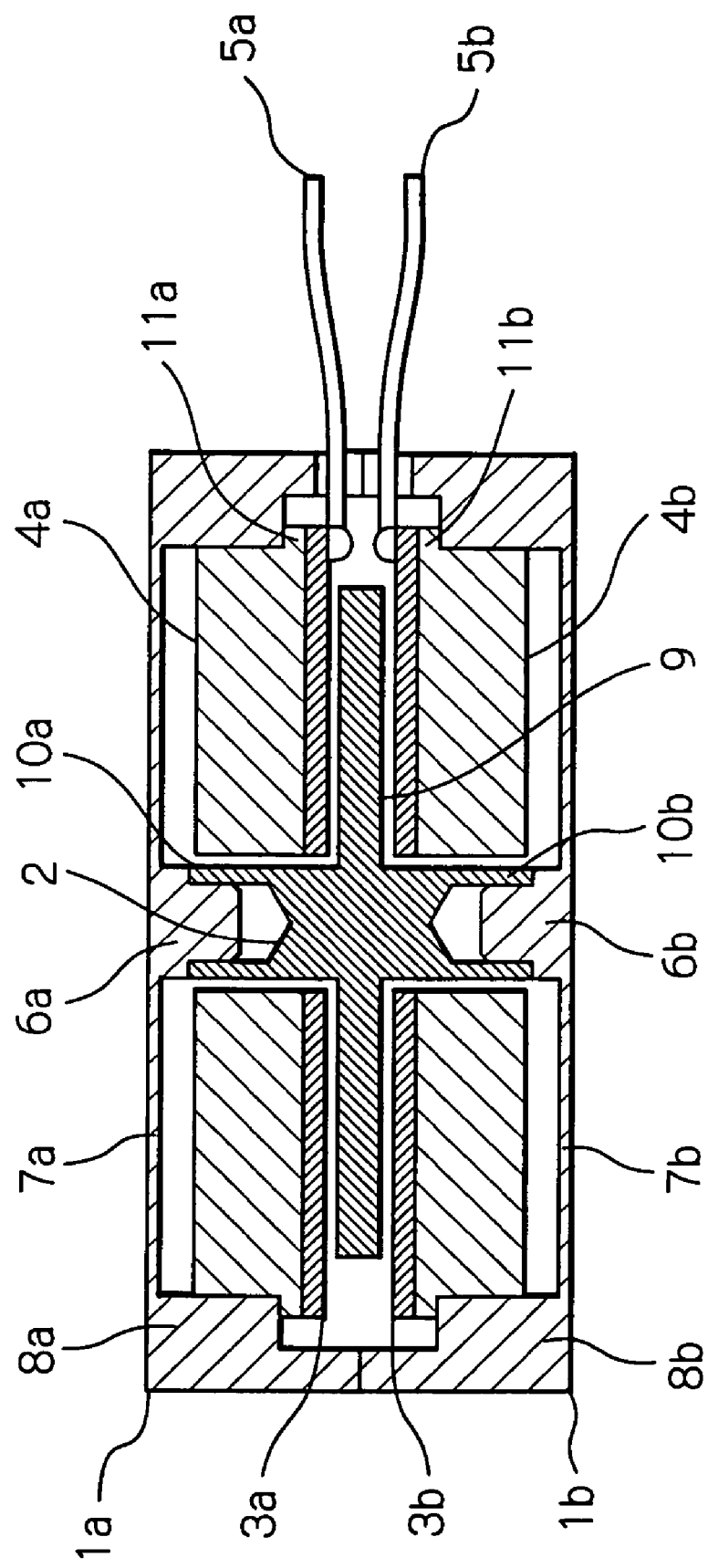
FIG. 4 is a sectional view of a differential pressure sensor according to a preferred embodiment of the present invention.
Figure 5:
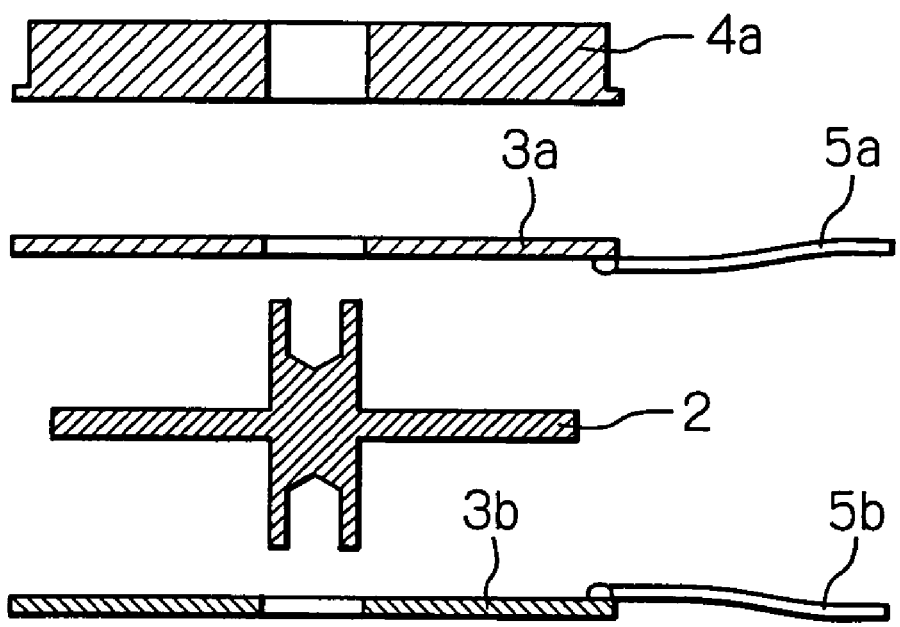
FIG. 5 is a disassembled sectional view of a differential pressure sensor of the present invention shown in FIG. 4.

Herein below, description is made with regard to a preferred embodiment of the present invention. FIG. 4 is a sectional view of a differential pressure sensor according to an embodiment of the present invention. FIG. 5 is a disassembled sectional view of the differential pressure sensor of FIG. 4. In FIG. 4, a pair of metal diaphragms 1a and 1b having the same outer shape is provided. The diaphragms 1a and 1b respectively comprise cylindrical projections 6a and 6b formed at central portions thereof. Thin and flat diaphragm portions 7a and 7b in annular forms are formed along the peripheries of the cylindrical projections 6a and 6b, respectively. Cylindrical support portions 8a and 8b are respectively formed along the outer peripheries of the diaphragm portions 7a and 7b. From the viewpoint of mechanical life, it is preferred that the diaphragms 1a and 1b are made of an alloy of Ni or an alloy of Ti. However, the diaphragms 1a and 1b can be formed from a non-metal material such as ceramic also. A movable electrode 2 made of a metal is secured, by press-fitting, to the projections 6a and 6b at the central portions of the diaphragms 1a and 1b. The movable electrode 2 comprises a disk-like electrode portion 9, with shaft-like projections 10a and 10b being formed at central portions of opposing surfaces of the electrode portion 9. The shaft-like projections 10a and 10b include center holes into which the projections 6a and 6b of the diaphragms 1a and 1b are press-fitted. Further, electrically insulated disks 4a and 4b formed from an electrically insulated material are provided. The electrically insulated disks 4a and 4b are disk-like members including through-holes, through which the shaft-like projections 10a and 10b of the movable electrode 2 extend. Fixed electrodes 3a and 3b made of a metal are adhered to a surface of the electrically insulated disk 4a and a surface of the electrically insulated disk 4b, respectively. The fixed electrodes 3a and 3b also include through-holes for allowing the shaft-like projections 10a and 10b of the movable electrode 2 to extend there through. The electrically insulated disks 4a and 4b include flange portions 11a and 11b formed at outer peripheral portions thereof, and are secured at these flange portions 11a and 11b to the support portions 8a and 8b of the diaphragms 1a and 1b. As is clearly shown in FIG. 4, the diaphragms 1a and 1b, to which the electrically insulated disks 4a and 4b are secured, are fixed by press-fitting the projections 6a and 6b into the center holes of the shaft-like projections 10a and 10b on vertically opposite sides of the movable electrode 2. In this state, the fixed electrodes 3a and 3b face the electrode portion 9 of the movable electrode 2. The outer peripheral connecting portions of the diaphragms 1a and 1b are connected to each other by spot welding. The fixed electrodes 3a and 3b are electrically connected to lead wires 5a and 5b, and the lead wires 5a and 5b are extended through openings formed in the diaphragms 1a and 1b to the outside of the sensor.

In the sensor arranged as mentioned above, the capacitors C1 and C2 are formed between the movable electrode 2 and the fixed electrode 3a and between the movable electrode 2 and the fixed electrode 3b, respectively. That is, this sensor is a so-called capacitor-type differential pressure sensor adapted to detect a difference between pressures as a difference between capacitances of the capacitors C1 and C2. Since the movable electrode 2 is electrically connected to the diaphragms 1a and 1b, the capacitances of the capacitors C1 and C2 are measured by measuring capacitances between the outside of the diaphragms and the lead wires 5a and 5b.

In this sensor, the movable electrode 2 is located between the fixed electrodes 3a and 3b so that the movable electrode 2 is equally spaced from the fixed electrodes 3a and 3b, and as such when no pressure is applied to the surfaces of the diaphragm portions 7a and 7b of the diaphragms 1a and 1b, the respective capacitances of the capacitors C1 and C2 are equal. When a pressure P1 and a pressure P2 are applied to the diaphragms 1a and 1b, the movable electrode 2 moves upward or downward (as viewed in FIG. 4) according to a difference between the pressures P1 and P2, to thereby produce a difference between the capacitances of the capacitors C1 and C2. This difference in capacitance is detected by means of a capacitance-bridge circuit, to thereby measure a differential pressure.

Figure 1:
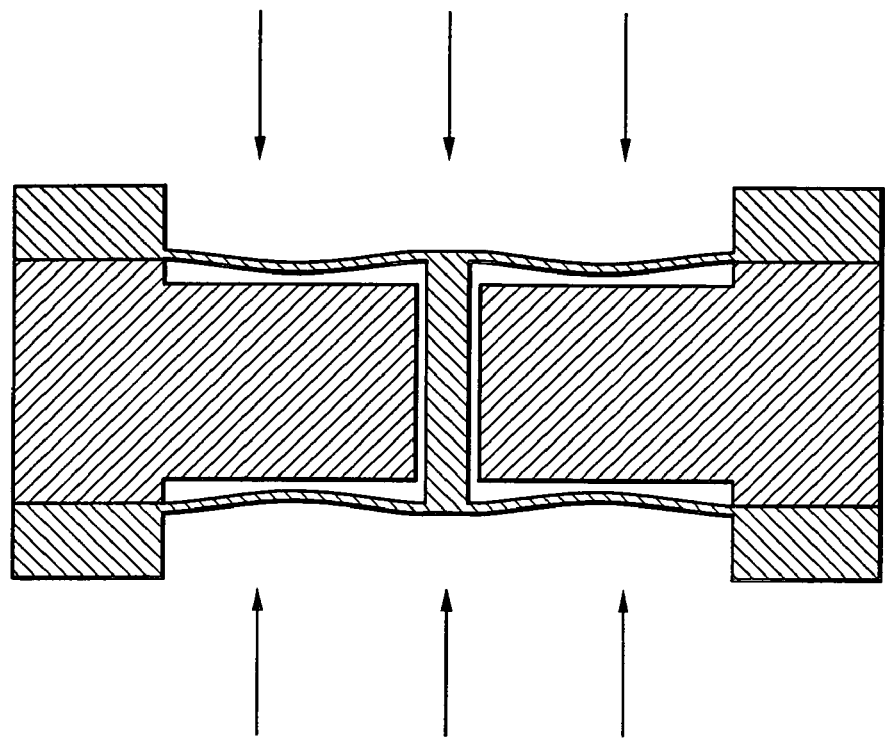
FIG. 1 is a sectional view indicating deformation of diaphragms under high pressure in a conventional differential pressure sensor.
Figure 2:
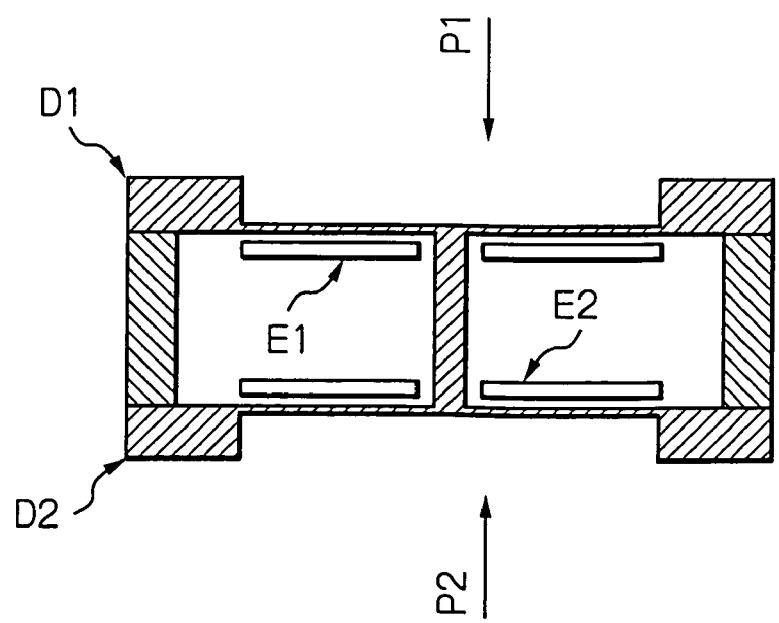
FIG. 2 is a diagram for explaining an operation of a conventional capacitor-type differential pressure sensor.

When the pressure applied to both of the diaphragm portions 7a and 7b increases to a level as high as, for example, 300 kPa, each diaphragm is subject to intricate deformation such as that shown in FIG. 1, as in the case of the conventional differential pressure sensor. In the differential pressure sensor of the present invention, however, differing from the conventional technique, a capacitor electrode is not formed by the diaphragm itself, but is formed by the movable electrode 2 disposed between the diaphragms 1a and 1b. Since opposite sides of the movable electrode 2 are pressed under equal forces by the diaphragms 1a and 1b, a position of the movable electrode 2 does not change even when deformation of the diaphragms occurs, and therefore no change occurs with respect to the capacitances of the capacitors C1 and C2 formed between the movable electrode 2 and the fixed electrodes 3a and 3b. Therefore, if the baseline pressure changes considerably, a zero output is stable, and accurate measurement can be conducted.

Figure 3:
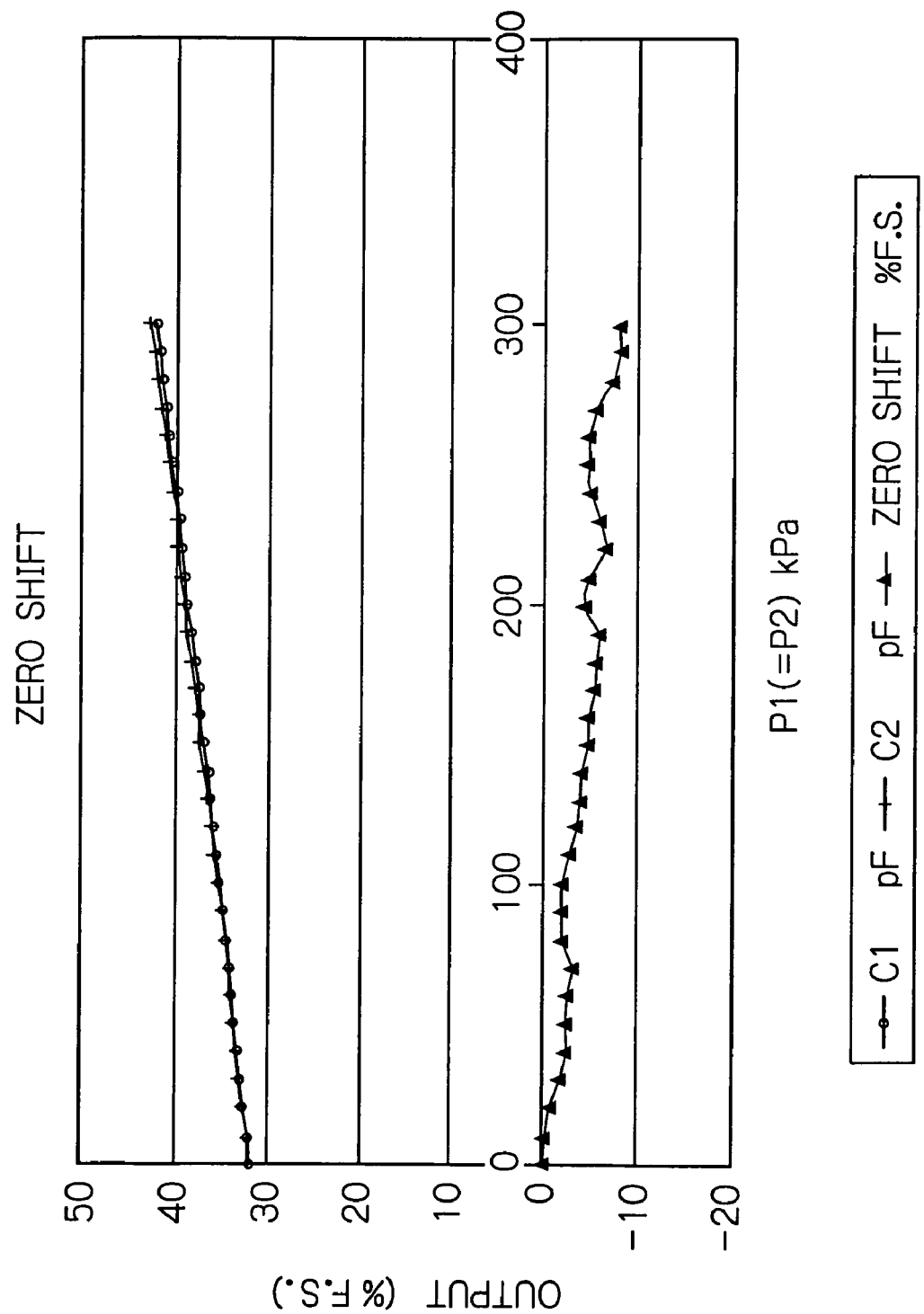
FIG. 3 is a graph indicating a change in capacitance of capacitors C1 and C2 and a shift of a zero point according to a pressure applied, in the conventional capacitor-type differential pressure sensor.

FIG. 6a is a graph indicating results of measurements of outputs of the capacitors C1 and C2 and a shift of a zero point in the differential pressure sensor according to the present invention. As compared to the case of the conventional differential pressure sensor shown in FIG. 3, the outputs of the capacitors C1 and C2 are substantially unchanged and a zero point, which is detected from a difference between the outputs of the capacitors C1 and C2, is also substantially unchanged and stable, even when a pressure applied to the diaphragms increases.

Figure 6B:
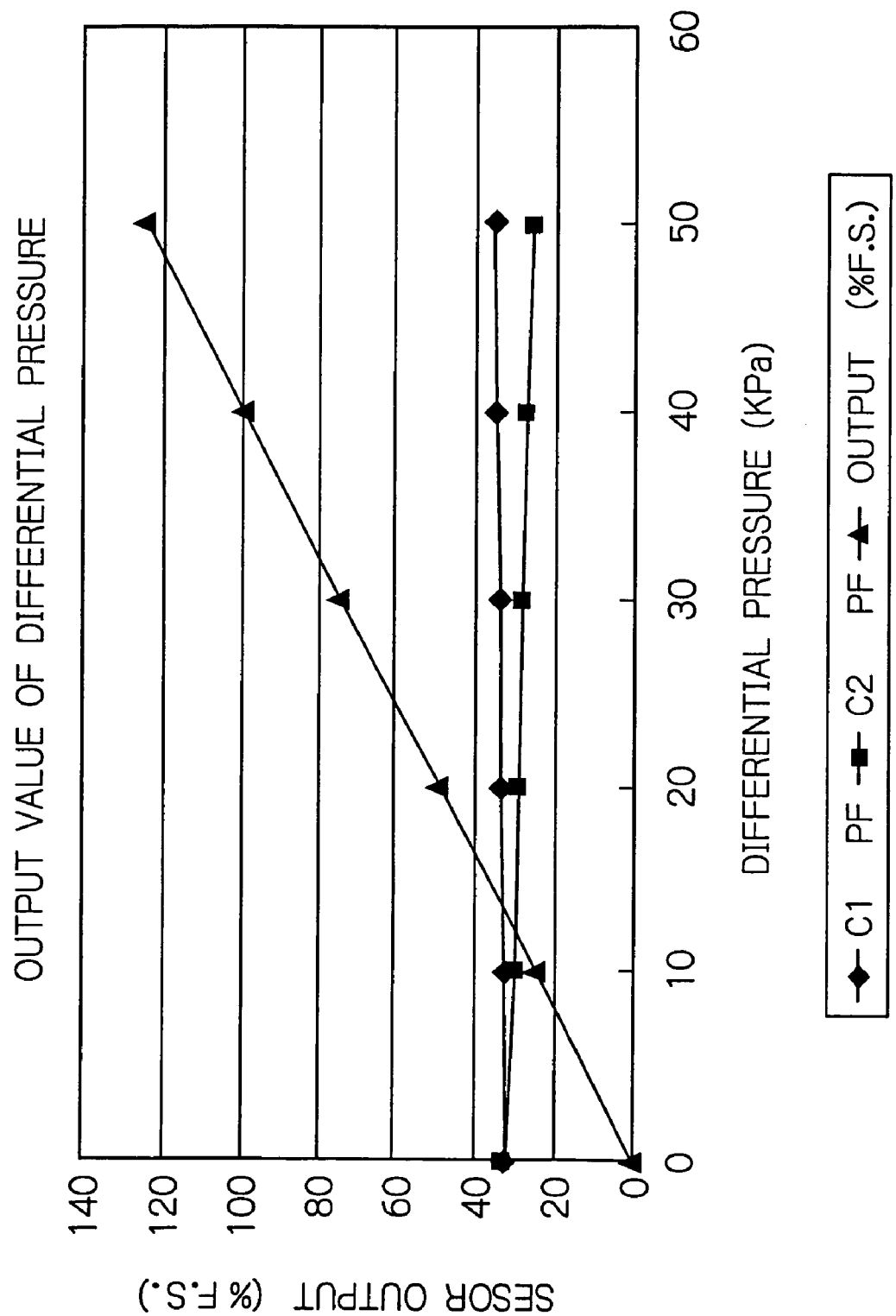
FIG. 6b is a graph indicating results of differential pressure measurement conducted by the differential pressure sensor of the present invention.

FIG. 6b is a graph indicating results of differential pressure measurement conducted by the differential pressure sensor of the present invention. As is understood from FIG. 6b, since a zero output is stable in the differential pressure sensor of the present invention, sufficiently high sensitivity to a differential pressure can be obtained.

Figure 6C:
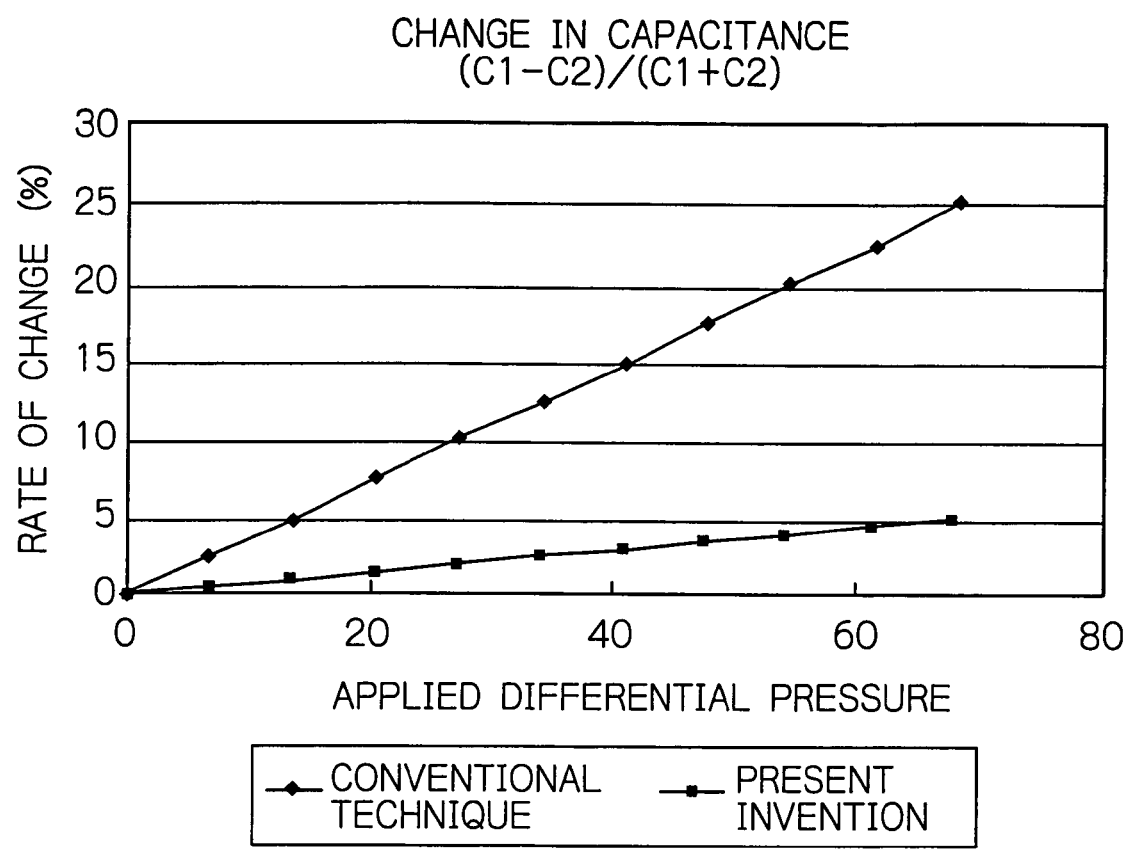
FIG. 6c is a graph indicating sensitivity of the sensor of the present invention and a conventional sensor which directly detects deformation of the diaphragm as a change in capacitance of the capacitor.
Figure 6C:
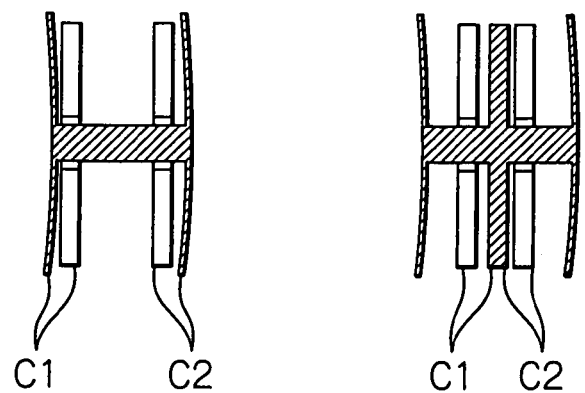

FIG. 6c consists of data indicating the sensitivity of a conventional sensor for direct sensing of deformation of the diaphragm as a change in capacitance of the capacitor and the sensitivity of the sensor in this embodiment of the present invention. In the present invention, a maximum amount of displacement of a central portion of the diaphragm is reflected in the gap of the capacitor. Therefore, an amount of change in capacitance of the capacitor becomes large, and the sensor sensitivity becomes several times higher than that of the conventional sensor.

Figure 7:
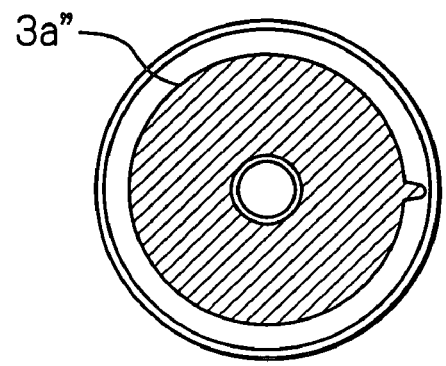
FIG. 7 is a diagram indicating another example of an electrically insulated disk in a differential pressure sensor of the present invention.
Figure 7:
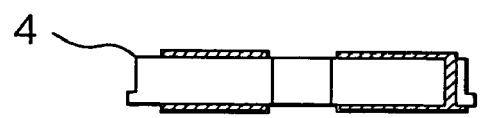
Figure 7:
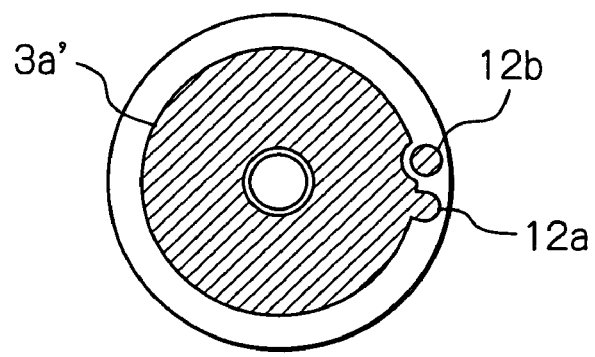

FIG. 7 is a diagram indicating another example of an electrically insulated disk in a differential pressure sensor of the present invention. In an electrically insulated disk 4 in this example, a fixed electrode 3a' is formed by Ni plating, and a fixed electrode 3a" is also formed by Ni plating on a rear surface, i.e., the surface facing the diaphragm 1a, of the disk 4. The fixed electrodes 3a' and 3a" are electrically connected to the outside by means of lead wires from lead terminals 12a and 12b provided in the disk 4 on a side of the fixed electrode 3a'. By use of the electrically insulated disk 4 thus arranged, a capacitor is formed between the diaphragm 1a and the fixed electrode 3a", in addition to the capacitor formed between the movable electrode 2 and the fixed electrode 3a'. By detecting a change in capacitance of the capacitor between the diaphragm 1a and the fixed electrode 3a', a change in baseline pressure can be detected. Therefore, if desired, a signal output indicating a differential pressure can be corrected based on a signal output indicating a baseline pressure.

Figure 8:
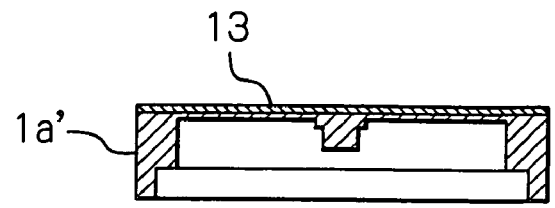
FIG. 8 is a sectional view indicating another example of a diaphragm.

FIG. 8 is a sectional view indicating another example of a diaphragm. In this example, a surface of the diaphragm 1a' is coated with a fluorine-type polymer resin 13. With this arrangement, the differential pressure sensor can be used for measuring a pressure of a chemical liquid that is highly reactive.

A preferred embodiment of the present invention has been described above. However, it is apparent to a person skilled in the art that various changes and modifications are possible without departing from the scope of the idea or concept of the present invention. All such changes and modifications should be incorporated in the scope of the present invention.

What is claimed is:

1. A differential pressure sensor comprising:
    a pair of diaphragms each capable of being deformed according to a pressure applied, each of said pair of diaphragms being at least partially made of a metal and having a common center axis;
    a movable electrode provided between said pair of diaphragms and located on said common center axis, said movable electrode being at least partially made of a metal, each of opposing surfaces of said movable electrode including a projection formed at a central portion thereof, said projection being secured to a central portion of an associated one of said diaphragms; and
    fixed electrodes held by outer peripheral portions of said pair of diaphragms, so as to face said opposing surfaces of the movable electrode,
    wherein a change in capacitance between said movable electrode and each of said fixed electrodes is detected to determine a differential pressure.

2. A differential pressure sensor according to claim 1, wherein said fixed electrodes are formed by a pair of fixed electrodes respectively provided on surfaces of electrically insulated members, said electrically insulated members being secured to said outer peripheral portions of the pair of diaphragms.

3. A differential pressure sensor according to claim 2, wherein another fixed electrode is provided on a surface of each of said electrically insulated members, which surface is in opposing relation to the surface on which one of said pair of fixed electrodes is provided.

4. A differential pressure sensor according to claim 2, wherein a hole is formed at a central portion of each of said pair of fixed electrodes so as to allow said projection of the movable electrode to extend therethrough, and a hole is also formed at a central portion of each of said electrically insulated members so as to allow said projection of the movable electrode to extend therethrough.

5. A differential pressure sensor according to claim 3, wherein said differential pressure sensor is operable to correct an output value of the differential pressure, based on a change in capacitance between said another fixed electrode and the diaphragm facing said another fixed electrode.

6. A differential pressure sensor according to claim 1, wherein a surface of each of said pair of diaphragms that makes contact with an object to be detected is at least partially covered by a fluorine-type polymer resin.

7. A differential pressure sensor according to claim 2, wherein a surface of each of said pair of diaphragms that makes contact with an object to be detected is at least partially covered by a fluorine-type polymer resin.

8. A differential pressure sensor according to claim 3, wherein a surface of each of said pair of diaphragms that makes contact with an object to be detected is at least partially covered by a fluorine-type polymer resin.

9. A differential pressure sensor according to claim 4, wherein a surface of each of said pair of diaphragms that makes contact with an object to be detected is at least partially covered by a fluorine-type polymer resin.

10. A differential pressure sensor according to claim 5, wherein a surface of each of said pair of diaphragms that makes contact with an object to be detected is at least partially covered by a fluorine-type polymer resin.

11. A differential pressure sensor according to claim 1, wherein the movable electrode comprises a disk-shaped portion.

12. A differential pressure sensor according to claim 1, wherein each of the projections comprises a hollow shaft.

13. A differential pressure sensor according to claim 2, wherein each of the electrically insulated members is an electrically insulated disk.

14. A differential pressure sensor according to claim 6, wherein the polymer resin comprises fluorine.

* * * * *